US009786190B2

(12) United States Patent
So et al.

(10) Patent No.: US 9,786,190 B2
(45) Date of Patent: Oct. 10, 2017

(54) SIMULATION DEVICE HAVING REPLACEABLE SENSORY MODULE

(71) Applicant: KOREA INSTITUTE OF INDUSTRIAL TECHNOLOGY, Cheonan (KR)

(72) Inventors: Byung Rok So, Seongnam (KR); Sung Il Yi, Seoul (KR); Sang Jun Lee, Seoul (KR)

(73) Assignee: KOREA INSTITUTE OF INDUSTRIAL TECHNOLOGY, Cheonan (KR)

( * ) Notice: Subject to any disclaimer, the term of this patent is extended or adjusted under 35 U.S.C. 154(b) by 0 days.

(21) Appl. No.: 15/321,753

(22) PCT Filed: May 29, 2015

(86) PCT No.: PCT/KR2015/005365
§ 371 (c)(1),
(2) Date: Dec. 23, 2016

(87) PCT Pub. No.: WO2015/199337
PCT Pub. Date: Dec. 30, 2015

(65) Prior Publication Data
US 2017/0148338 A1    May 25, 2017

(30) Foreign Application Priority Data
Jun. 25, 2014 (KR) ........................ 10-2014-0078122

(51) Int. Cl.
*A63G 31/16* (2006.01)
*G09B 9/00* (2006.01)
(Continued)

(52) U.S. Cl.
CPC ............... *G09B 9/00* (2013.01); *A63G 31/14* (2013.01); *A63G 31/16* (2013.01); *G09B 9/02* (2013.01); *G09B 9/06* (2013.01); *G09B 9/066* (2013.01)

(58) Field of Classification Search
CPC ........ A63G 31/00; A63G 31/02; A63G 31/16; G09B 9/00; G09B 9/02; G09B 9/04; G09B 9/06; G09B 9/08; G09B 9/12; G09B 9/165
(Continued)

(56) References Cited

U.S. PATENT DOCUMENTS 6,533,670 B1 * 3/2003 Drobnis ................. A63G 31/16
434/55
6,632,092 B2 * 10/2003 Moran ................... G09B 19/16
434/55
(Continued)

FOREIGN PATENT DOCUMENTS

KR    20-1999-0038619 U    10/1999

*Primary Examiner* — Kien Nguyen
(74) *Attorney, Agent, or Firm* — Patent Office of Dr. Chung Park

(57) ABSTRACT

The present invention relates to a simulation device having a replaceable sensory module, which comprises: a first platform for performing a translational motion with reference to a first three-dimensional coordinate axis; a second platform which is coupled to the first platform and performs a rotational motion with reference to at least one axis among second three-dimensional coordinate axes; and a sensory module coupled to the second platform and arranged to support a user to enable the user to sense a motion provided by the first and second platforms.

6 Claims, 10 Drawing Sheets

(51) Int. Cl.
   *G09B 9/02* (2006.01)
   *G09B 9/06* (2006.01)
   *A63G 31/14* (2006.01)

(58) Field of Classification Search
   USPC .................... 472/59–61, 130; 434/29, 55, 58
   See application file for complete search history.

(56) References Cited

U.S. PATENT DOCUMENTS

| | | |
|---|---|---|
| 2003/0180693 A1 | 9/2003 | Mulder et al. |
| 2003/0224333 A1* | 12/2003 | Vastvedt ................ G09B 9/165 434/29 |
| 2007/0117068 A1* | 5/2007 | Nelms ...................... G09B 9/02 434/29 |

* cited by examiner

SIMULATION DEVICE HAVING REPLACEABLE SENSORY MODULE

TECHNICAL FIELD

The present invention relates to a simulation device having a replaceable sensory module, and more particularly, to a simulation device having a replaceable sensory module, which realizes more realistic simulation while changing various sensory modules.

BACKGROUND ART

In general, a simulation device that allows a user to enjoy virtual experience is used in a variety of fields.

This simulation device is applied in various fields, for example, virtual reality experience for leisure, such as sports or games, and training for causing a user to master an operation of various transportation means.

The simulation device is usually configured such that a sensory module suitable for an operation that is to be experienced by a user is coupled to one platform and thus he or she rides in the sensory module.

This is operated to cause a user riding in the sensory module to feel as if he or she virtually experienced a specific motion while the platform controls the movement of the sensory module coupled to the platform.

In this regard, it may be necessary to change a central axis about which the simulation device simulates a motion, depending on the kind of the sensory module that is to be simulated by the simulation device.

For example, in the case of a riding-type motion similar to the motion of a horse, the central axis about which the horse moves should be in a body of the horse. Hence, the central axis of the motion is correspondingly changed.

However, if the sensory module of a horse model is coupled to a top of the platform, a motion central axis is in a position of the platform. Thus, a difference may occur between the motion central axis felt by a user when a motion is simulated and an actual central axis, thus deteriorating the reality of simulated motion.

In order to solve the problems, a method in which a portion of the sensory module is cut away and the motion central axis matches to be similar to the actual central axis has been attempted.

However, this method is problematic in that the appearance of the sensory module is not realistic, and a space of the sensory module in which a user rides may be insufficient due to the shape of the platform.

DISCLOSURE

Technical Problem

Accordingly, the present invention has been made keeping in mind the above problems occurring in the related art, and is intended to provide a simulation device having a replaceable sensory module, which realizes more realistic simulation while changing various sensory modules.

Technical problems that are to be solved by the present invention are not limited to the above-mentioned aspect, and other technical aspects that are not mentioned herein will be clearly understood by those skilled in the art from the following description.

Technical Solution

According to an aspect of the present invention, there is provided a simulation device having a replaceable sensory module, including a first platform performing a translational motion with reference to a first three-dimensional coordinate axis, a second platform coupled to the first platform and performing a rotational motion with reference to at least one axis among second three-dimensional coordinate axes, and a sensory module coupled to the second platform and supporting a user to enable the user to sense a motion provided by the first and second platforms.

According to another aspect of the present invention, the second platform may be coupled to the first platform such that a vertical axis of the second coordinate axes and a vertical axis of the first coordinate axis may be provided on a vertically extrapolated line.

According to a further aspect of the present invention, the second platform may perform a rotational motion with reference to two axes that may be on a plane of the second coordinate axes, and the first platform may perform a translational motion with reference to the first coordinate axis while may simultaneously perform a rotational motion with reference to the first coordinate axis and the vertical axis of the second coordinate axes.

According to still another aspect of the present invention, the first coordinate axis of the first platform and the second coordinate axis of the second platform may be different in coordinate central point from each other.

According to yet another aspect of the present invention, the second platform may be provided on a position of a coordinate axis of a motion simulated by the sensory module, and may be coupled to the sensory module.

According to another aspect of the present invention, the simulation device may further include a displacement module provided between the first platform and the second platform to couple the first platform with the second platform, and tri-dimensionally adjusting a position of the second platform.

According to another aspect of the present invention, the sensory module may be selectively separated from the second platform.

According to another aspect of the present invention, the sensory module may include the second platform on a motion coordinate axis of a motion that is to be simulated, and the second platform may be selectively separated from the first platform.

Advantageous Effects

According to the present invention, the simulation device having the replaceable sensory module may provide more realistic simulation while changing various sensory modules.

The effects of the present invention are not limited to the above-mentioned effect, and other effects that are not mentioned herein will be clearly understood by those skilled in the art from the following claims.

BEST MODE FOR THE INVENTION

Exemplary embodiments of the present invention will be described below in more detail with reference to the accompanying drawings. However, the description of known functions or configurations will be omitted herein to make the gist of this invention clear.

Further, in the description of this invention, terms indicating directions, for example, "front", "rear", "upper" or "lower" are intended to enable those skilled in the art to clearly understand the invention, and are merely relative directions, so that they do not limit the scope of the invention.

First, problems of a conventional simulation device will be described with reference to FIGS. 1 and 2.

Figure 1:
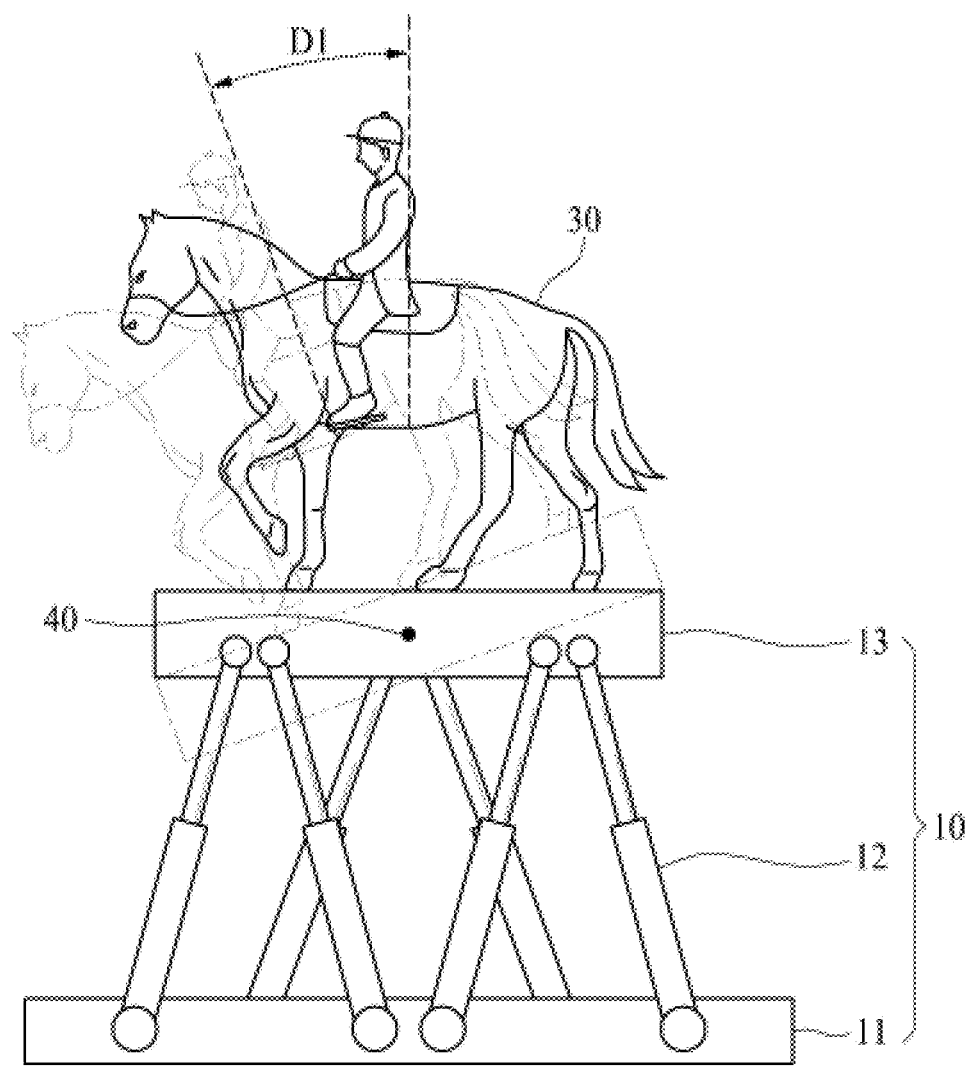
FIG. 1 is a view illustrating an example of a conventional simulation device.
Figure 2:
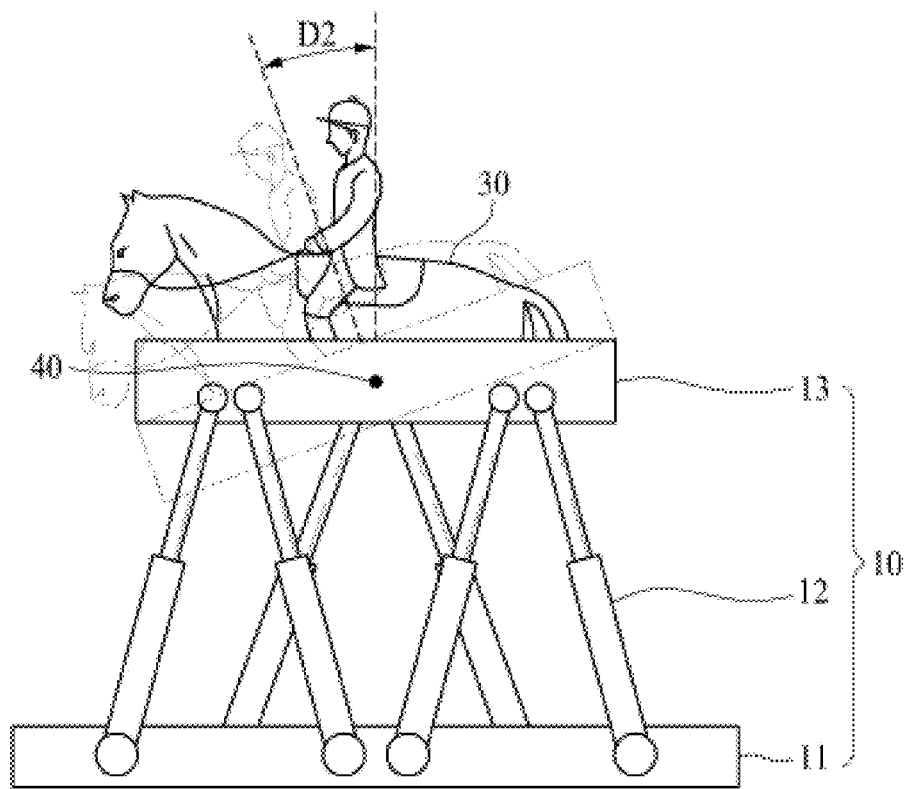
FIG. 2 is a view illustrating a variation of the conventional simulation device.

Here, FIG. 1 is a view illustrating an example of a conventional simulation device, and FIG. 2 is a view illustrating a variation of the conventional simulation device.

As illustrated in FIGS. 1 and 2, the conventional simulation device is configured such that a sensory module 30 fit for an operation that a user desires to experience is coupled to one platform 10 and the user rides in the sensory module 30.

Generally, the conventional platform 10 includes a base 11 that comes into contact with the ground to support an entire simulation device, a varying frame 12 that is coupled to a side of the base 11 to support a top plate 13 that will be described later, and the top plate 13 that is coupled to the varying frame 12 to support the sensory module 30.

While the varying frame 12 of the platform 10 adjusts an angle and a length for supporting the top plate 13, a position and an angle of the top plate 13 are controlled, thus simulating a specific motion.

In this case, it may be necessary to change the central axis about which the motion simulated by the simulation device generates, depending on the kind of the sensory module 30 coupled to the top of the top plate 13.

For example, in the case of a riding-type motion such as a horse's motion, the central axis about which a horse moves is in a body of the horse. Thus, if the sensory module 30 of the horse model is coupled to the top plate 13 of the platform 10, a user shaking distance D1 when the motion performs with reference to the motion central axis 40 of the top plate 13 is longer than a user shaking distance D2 when the motion performs about the horse's body as a central axis, so that the reality of the simulated motion is reduced.

Therefore, only a part of an upper portion of the horse model is coupled to the sensory module 30, and the motion central axis 40 of the top plate 13 is near to the motion central axis of the horse, thus allowing the motion to be more realistically simulated.

However, in this case, the appearance of the sensory module 30 is poor in reality, and a space of the sensory module 30 in which a user rides may be insufficient due to the platform 10.

A simulation device having a replaceable sensory module according to the present invention that is configured to solve these problems will be described in detail.

First, the configuration of the simulation device having the replaceable sensory module according to the present invention will be described in detail with reference to FIGS. 3 to 6.

Figure 3:
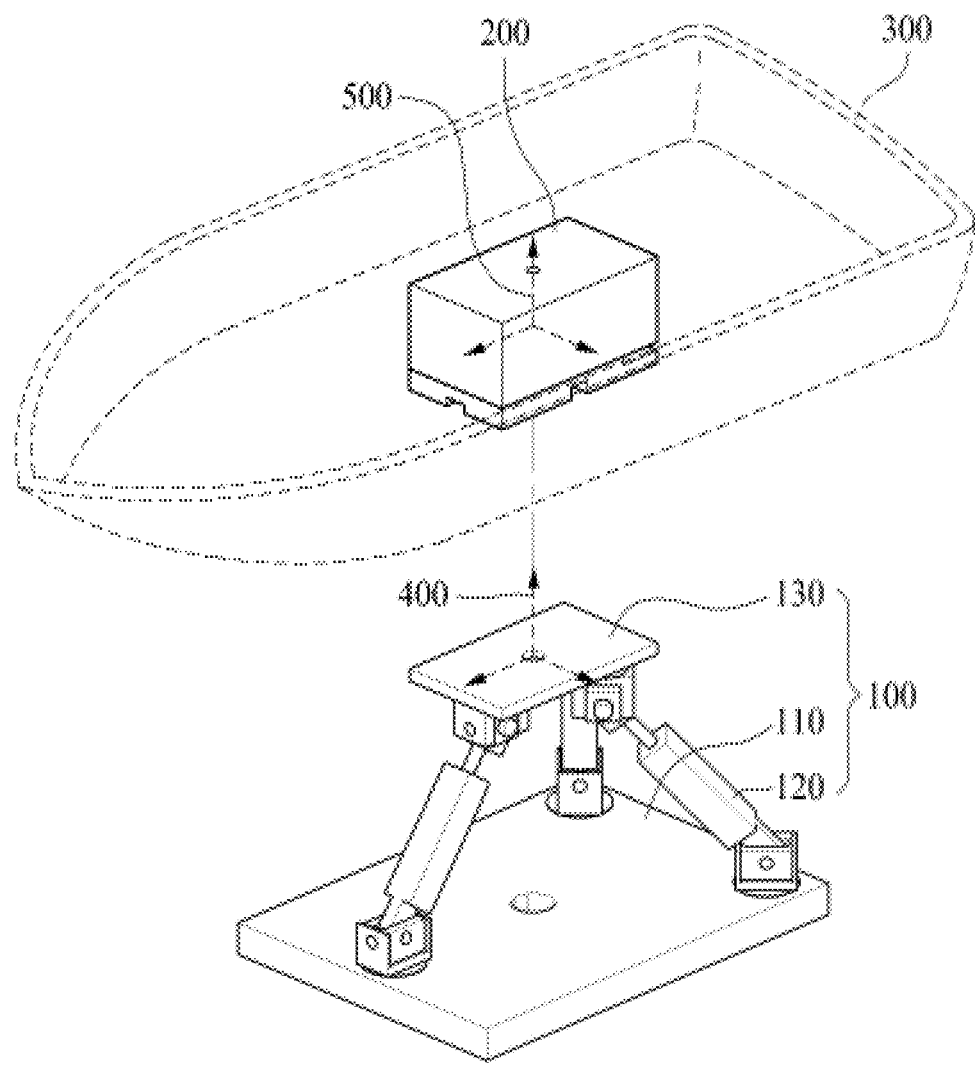
FIG. 3 is a view illustrating an entire configuration of a simulation device having a replaceable sensory module according to the present invention.

Here, FIG. 3 is a view illustrating an entire configuration of the simulation device having the replaceable sensory module according to the present invention.

Figure 4:
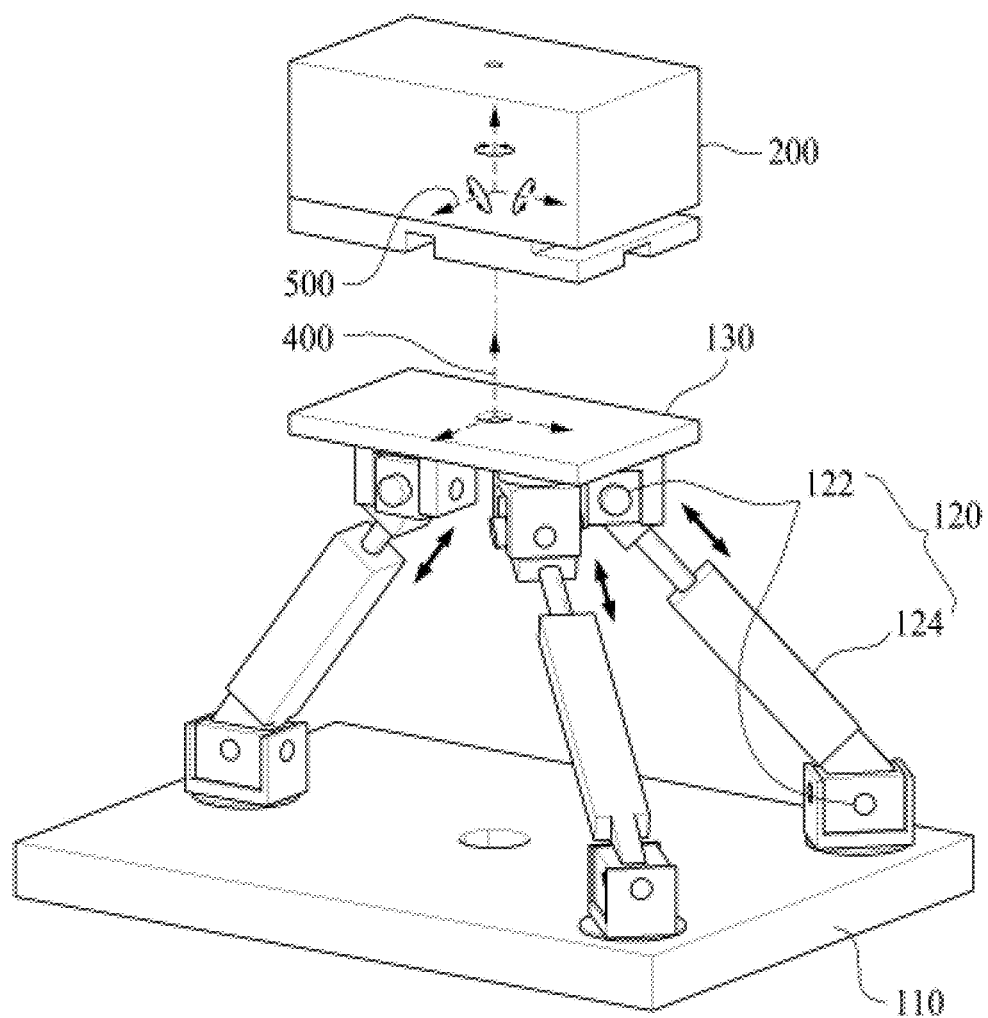
FIG. 4 is a view illustrating a configuration of a simulation device having a replaceable sensory module according to a first embodiment of the present invention.
Figure 5:
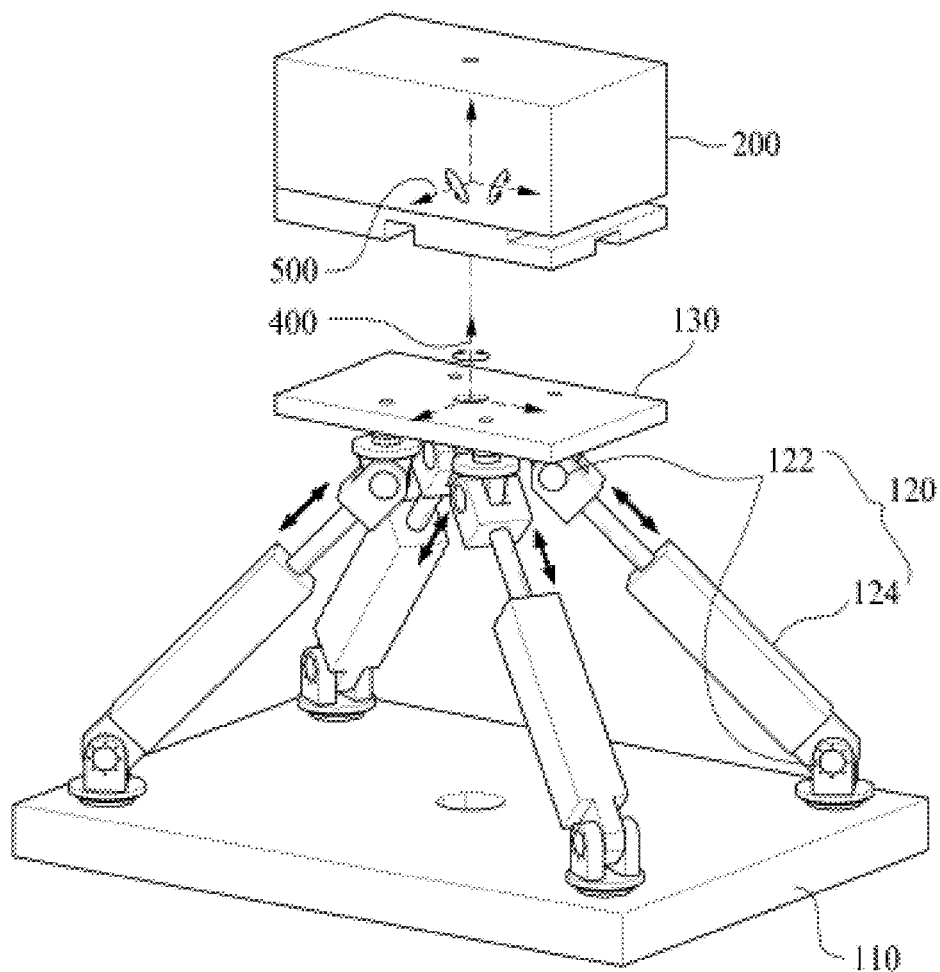
FIG. 5 is a view illustrating a configuration of a simulation device having a replaceable sensory module according to a second embodiment of the present invention.
Figure 6:
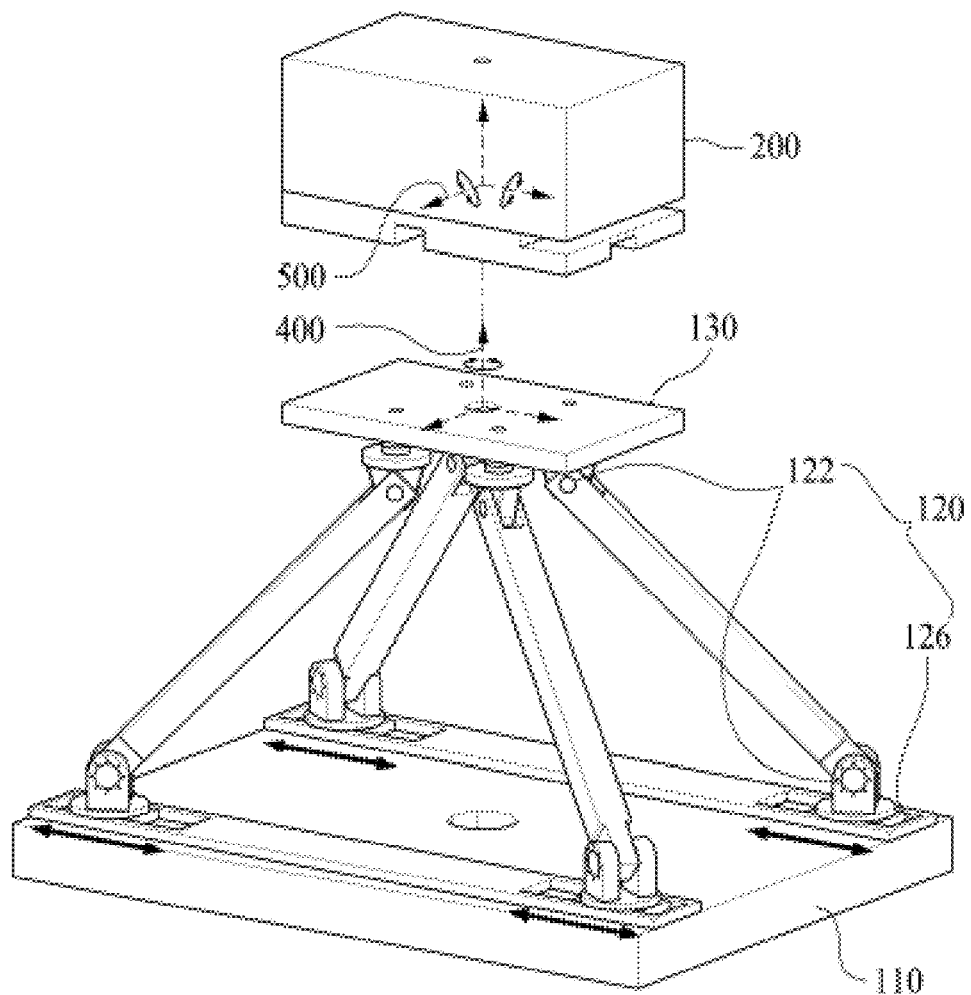
FIG. 6 is a view illustrating a configuration of a simulation device having a replaceable sensory module according to a third embodiment of the present invention.

Further, FIG. 4 is a view illustrating a configuration of a simulation device having a replaceable sensory module according to a first embodiment of the present invention, FIG. 5 is a view illustrating a configuration of a simulation device having a replaceable sensory module according to a second embodiment of the present invention, and FIG. 6 is a view illustrating a configuration of a simulation device having a replaceable sensory module according to a third embodiment of the present invention.

First, the first embodiment of the simulation device having the replaceable sensory module according to the present invention will be described below with reference to FIGS. 3 and 4.

As illustrated in FIGS. 3 and 4, the first embodiment of the simulation device having the replaceable sensory module according to the present invention includes a first platform 100, a second platform 200, and a sensory module 300.

The first platform 100 is a component that performs a translational motion with reference to a three-dimensional first coordinate axis 400, and may include a base 110 that comes into contact with the ground to support the entire simulation device, a varying frame 120 that is coupled to a side of the base 110 to support a top plate 130 that will be described later, and the top plate 130 that is coupled to the varying frame 120 to support the second platform 200 and the sensory module 300, similarly to the conventional simulation device.

Such a first platform 100 may be adjusted such that a position of the top plate 130 is controlled while the varying frame 120 adjusts an angle and a length for supporting the top plate 130, so that the top plate 130 translates with reference to the first coordinate axis 400.

Further, in this embodiment, three varying frames 120 are provided. Each varying frame 120 is coupled at one side thereof to the base 110 and coupled at the other side thereof to the top plate 130. A universal joint 122 that is freely rotatable in any direction may be coupled to a junction where the varying frame 120 is coupled to the base 110 or the top plate 130.

In this regard, the varying frame 120 is configured to be adjusted in length, so that the top plate 130 may perform the translational motion while the length of each varying frame 120 is adjusted.

The first platform 100 may have various shapes and configurations without being limited to this embodiment, as long as this may cause the translational motion to be performed for the purpose of desired simulation.

Meanwhile, the second platform 200 is coupled with the first platform 100, and is a component that performs a rotational motion with reference to at least one axis among three-dimensional second coordinate axes 500. In this embodiment, the second platform may perform the rotation motion with reference to all the three second coordinate axes 500.

The second platform 200 may likewise have various shapes and configurations without being limited to this embodiment, as long as this may cause the rotational motion to be performed for the purpose of desired simulation.

Meanwhile, the sensory module 300 is a component defining a space in which a user experiences a stimulated motion. It may be advantageous to form the sensory module so that it is similar in shape and size to an object for desired simulation.

Further, the sensory module 300 is coupled with the second platform 200. The sensory module may be preferably coupled with the second platform 200 such that the actual motion central axis for a motion that is to be performed by the sensory module 300 is the same as the second central axis 500 that is the central axis of the rotational motion that is to be performed by the second platform 200.

Subsequently, the second embodiment of the simulation device having the replaceable sensory module according to the present invention will be described below with reference to FIGS. 3 and 5.

As illustrated in FIGS. 3 and 5, the second embodiment of the simulation device having the replaceable sensory module according to the present invention includes a first platform 100, a second platform 200, and a sensory module 300.

Here, the basic configuration of the first platform 100 remains the same as the above-described first embodiment. As in the first embodiment, the first platform may be adjusted such that a position of the top plate 130 is controlled while the varying frame 120 adjusts an angle and a length for supporting the top plate 130, so that the top plate 130 translates with reference to the first coordinate axis 400.

However, in this embodiment, four varying frames 120 are provided. As the varying frames 120 are driven, the top plate 130 may perform the translational motion with reference to the first coordinate axis 400 and perform the rotation motion with reference to a vertical axis.

Further, the entire configuration of the second platform 200 is the same as the first embodiment.

However, in this embodiment, since the rotation motion with reference to the vertical axis is performed on the first platform 100, the second platform 200 may perform only the rotational motion with reference to two axes that are on a plane of the second coordinate axis 500.

Here, it may be advantageous that the first coordinate axis 400 of the first platform 100 and the second coordinate axis 500 of the second platform 200 are provided on a vertically extrapolated line.

When the first coordinate axis 400 implements a rotation about the vertical axis and the second coordinate axis 500 is present on the vertical axis of the first coordinate axis 400, the same motion is realized even if the rotational motion with reference to the vertical axis is implemented in either of the first platform 100 or the second platform 200.

Since the configuration of the sensory module 300 remains the same as that of the above-described first embodiment, a detailed description thereof will be omitted herein.

Subsequently, the third embodiment of the simulation device having the replaceable sensory module according to the present invention will be described below with reference to FIGS. 3 and 6.

As illustrated in FIGS. 3 and 6, the third embodiment of the simulation device having the replaceable sensory module according to the present invention includes a first platform 100, a second platform 200, and a sensory module 300.

Here, since the second platform 200 and the sensory module 300 are equal in configuration and operation as the above-described second embodiment, a detailed description thereof will be omitted herein.

Further, the base 110 and the top plate 130 of the first platform 100 according to this embodiment have the same configuration as those of the above-described first and second embodiments.

However, the varying frame 120 is coupled at one side to the base 110 and coupled at the other side to the top plate 130. A universal joint 122 that is freely rotatable in any direction may be coupled to a junction where the varying frame 120 is coupled to the base 110 or the top plate 130.

Here, the varying frame 120 itself is not adjusted in length, and a rail 126 may be configured to allow the universal joint 122 coupling the varying frame 120 to the base 110 to move to a predetermined length on the base 110.

That is, in this embodiment, four varying frames 120 are provided. As the universal joint 122 connecting the base 110 to the varying frame 120 moves along the rail 126, the angle of the varying frame 120 is adjusted and thereby the motion of the top plate 130 is adjusted.

Further, in this case, while the top plate 130 translates with respect to the first coordinate axis 400, the top plate may rotate with reference to the vertical axis.

Here, similarly to the above-describe second embodiment, it may be advantageous that the first coordinate axis 400 of the first platform 100 and the second coordinate axis 500 of the second platform 200 are provided on a vertically extrapolated line.

Subsequently, operations and effects of the first embodiment of the simulation device having a replaceable sensory module according to the present invention that may be configured as described above will be described in detail with reference to FIGS. 7 to 10.

Figure 7:
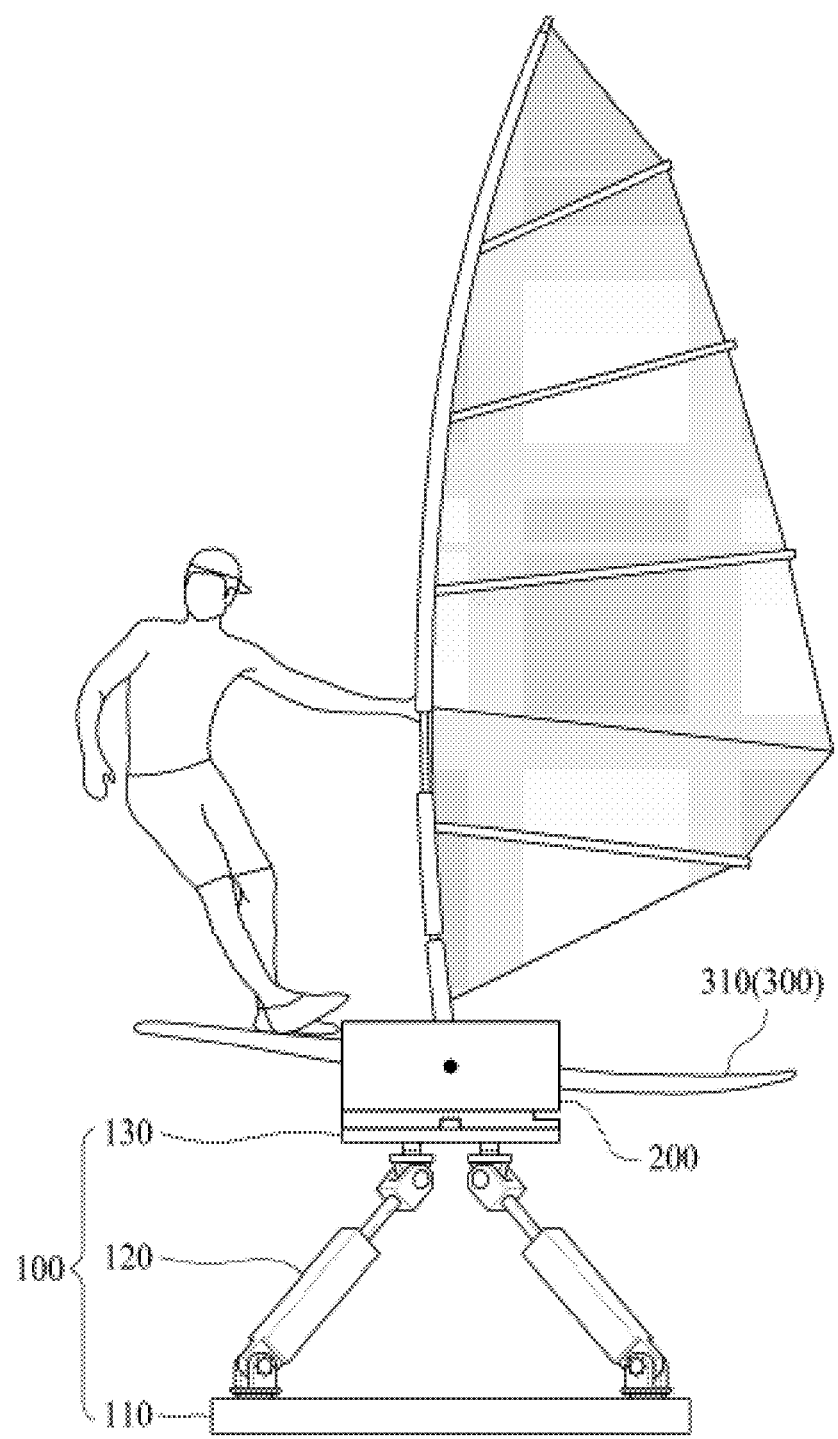
FIG. 7 is a view illustrating a state in which a standing-type sensory module is applied to the simulation device having the replaceable sensory module according to the present invention.
Figure 8:
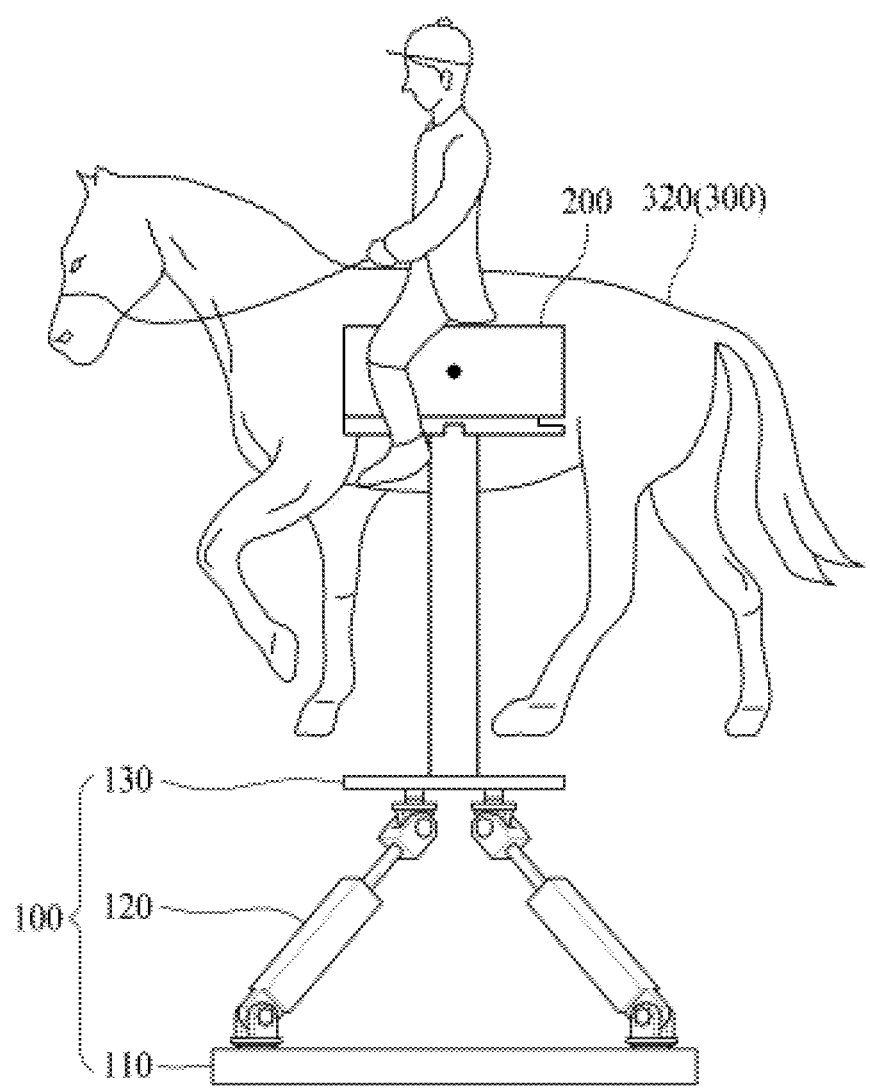
FIG. 8 is a view illustrating a state in which a ring-type sensory module is applied to the simulation device having the replaceable sensory module according to the present invention.

Here, FIG. 7 is a view illustrating a state in which a standing-type sensory module is applied to the simulation device having the replaceable sensory module according to the present invention, and FIG. 8 is a view illustrating a state in which a ring-type sensory module is applied to the simulation device having the replaceable sensory module according to the present invention.

Figure 9:
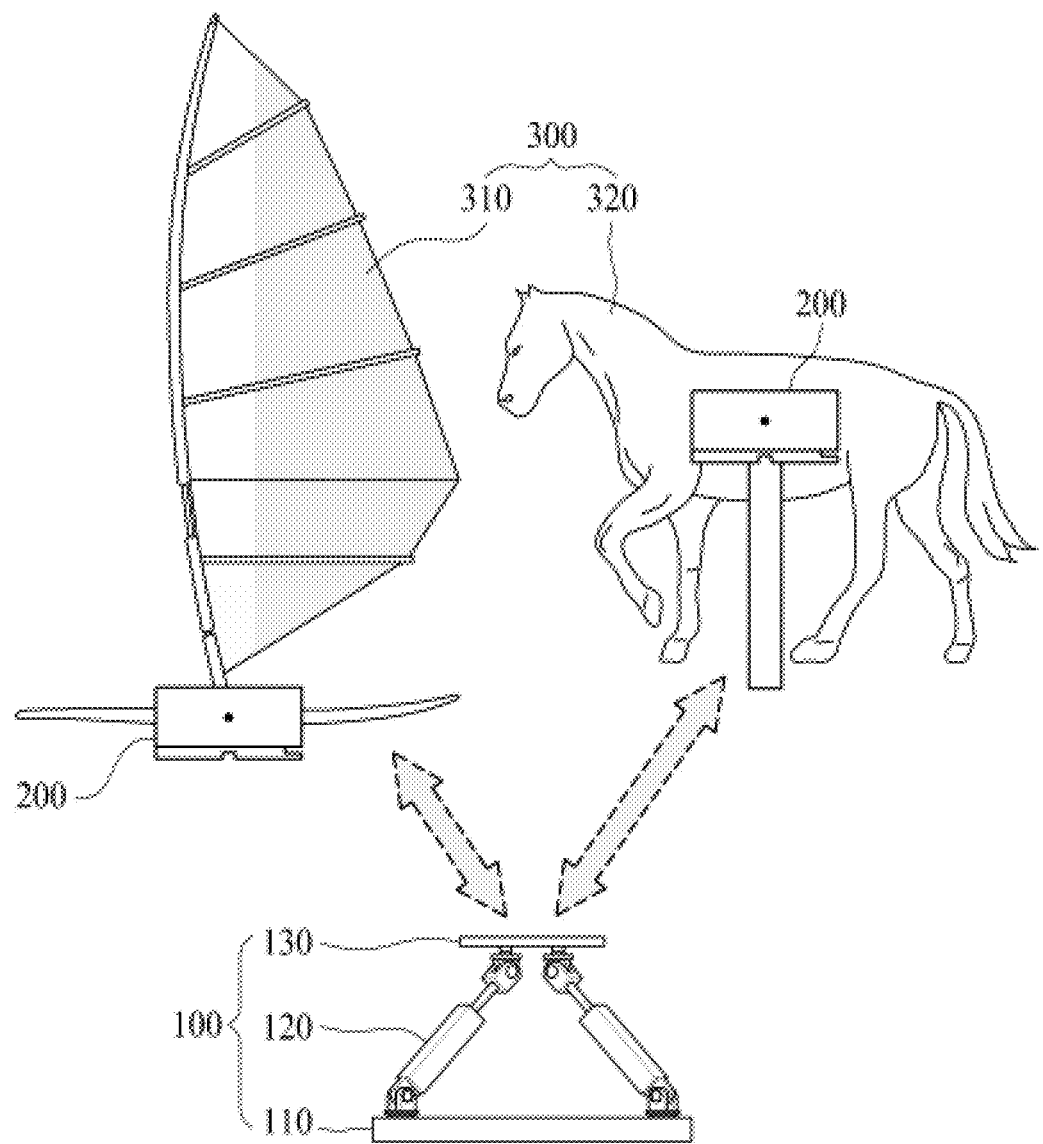
FIG. 9 is a view illustrating a state in which a first platform and a second platform are selectively separated and the sensory module is replaced.
Figure 10:
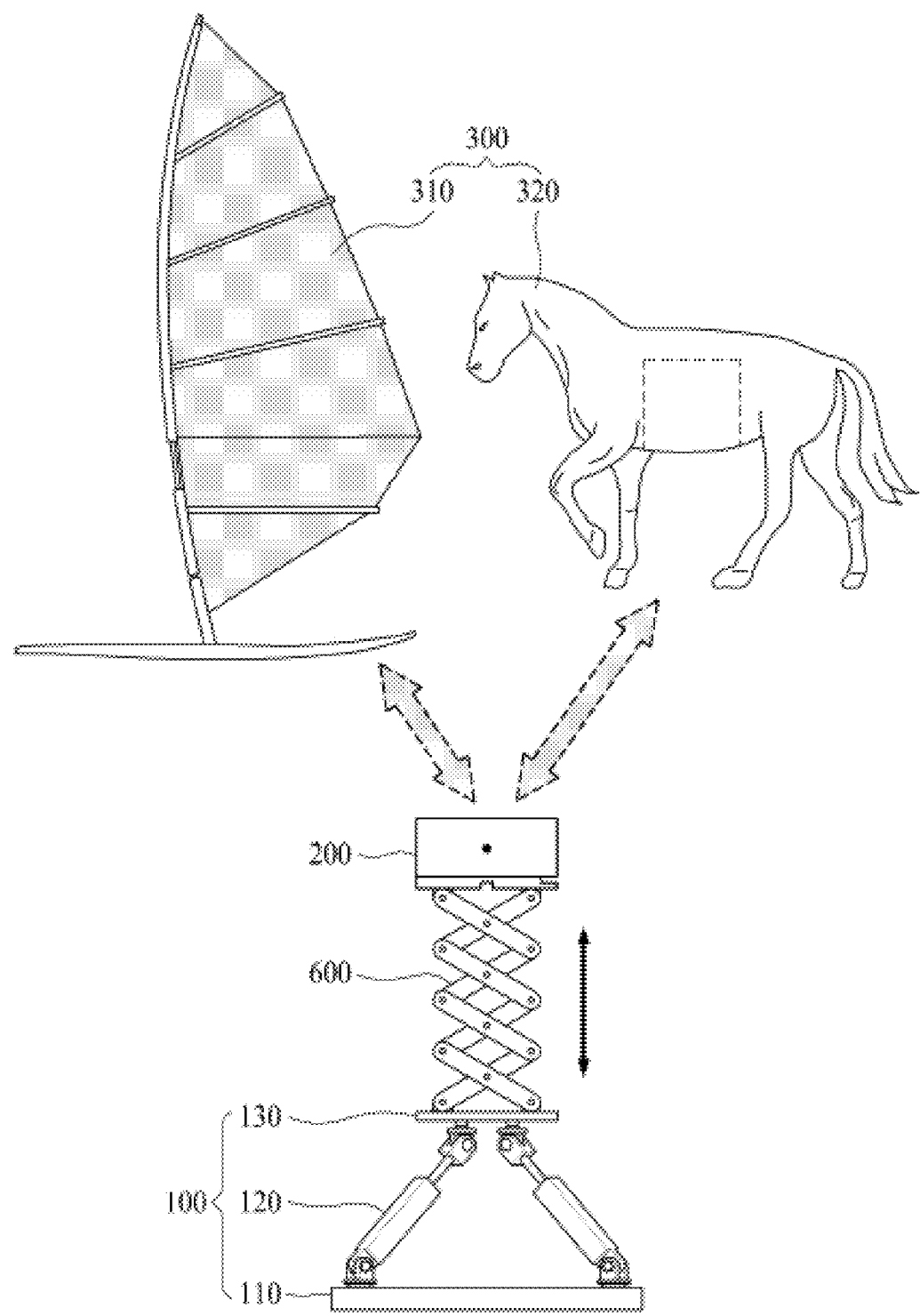
FIG. 10 is a view illustrating a state in which the second platform and the sensory module are selectively separated and the sensory module is replaced.

Further, FIG. 9 is a view illustrating a state in which a first platform and a second platform are selectively separated and the sensory module is replaced, and FIG. 10 is a view illustrating a state in which the second platform and the sensory module are selectively separated and the sensory module is replaced.

First, as illustrated in FIGS. 7 and 8, various sensory modules 300 may be applied to the simulation device having the replaceable sensory module according to the present invention.

In the case of the standing-type sensory module 310, since the motion central axis is on a lower portion of the standing-type sensory module 310, the first platform 100 and the second platform 200 of the simulation device having the replaceable sensory module according to the present invention are coupled with each other, and the standing-type sensory module 310 is coupled to the top of the second platform 200, thus achieving more realistic simulation.

Further, in the case of the riding-type sensory module 320, since the motion central axis is on a central portion of the riding-type sensory module 320, the second platform 200 of the simulation device having the replaceable sensory module according to the present invention is inserted into and coupled to the central portion of the riding-type sensory module 320, and this coupling is performed while an interval between the first platform 100 and the second platform 200 is maintained depending on the size of the riding-type sensory module 320, thus achieving more realistic simulation.

That is, the first coordinate axis 400 of the first platform 100 and the second coordinate axis 500 of the second platform 200 are different in coordinate central point from each other, so that the first platform 100 and the second platform 200 may be driven to separately perform the translational motion and the rotational motion for the purpose of desired simulation.

In the case of the translational motion, there is no difference between the simulated motion and the actual motion even if the motion is controlled at a position deviating from a central coordinate of the actual motion. However, if the central coordinate of the rotational motion deviates from a given central coordinate, the properties of the motion vary, thus reducing the reality of the motion sensed by a user.

Therefore, the second platform 200 partially or completely performs the rotational motion, thus implementing more realistic simulation.

Further, as illustrated in FIGS. 9 and 10, the simulation device having a replaceable sensory module according to the present invention may be configured such that the first platform 100, the second platform 200, and the sensory module 300 may be selectively separated from each other, thus allowing various sensory modules 300 to be replaced and coupled to the simulation device.

First, the various sensory modules 300 have separate second platforms 200, respectively. The sensory module 300 may include the second platform 200 such that the central coordinate of the motion simulated by each sensory module 300 is the same as the second coordinate axis 500 of the second platform 200.

In the case of inserting the second platform 200 into the sensory module 300, a support member protruding to a lower portion of the sensory module 300 is further provided to couple the second platform 200 and the first platform 100 to each other.

That is, the simulation device having the replaceable sensory module according to the present invention for stimulating various motions commonly utilizes the first platform 100, and replaces the sensory module 300 with another one, that is, replaces the standing-type sensory module 310 and the riding-type sensory module 320 each having the separate second platform 200 at a central coordinate position of each motion with each other by selectively coupling or separating the first platform 100 to or from the second platform 200.

Meanwhile, the first platform 100 and the second platform 200 may be used in common.

In this case, each sensory module 300 defines a space to allow the second platform 200 to be coupled thereto. The sensory module 300 may be replaced with another one by coupling either the standing-type sensory module 310 or the riding-type sensory module 320 to the second platform 200 that is coupled with the first platform 100.

Here, the standing-type sensory module 310 is coupled to the second platform 200 that is coupled with the first platform 100, thus carrying out the simulation. In the case of the riding-type sensory module 320, it is advantageous that the second platform 200 is spaced apart from the first platform 100 by a predetermined interval, to be inserted into and coupled to the riding-type sensory module 320.

Therefore, when the first platform 100 is coupled to the second platform 200, a displacement module 600 may be further provided between the first platform 100 and the second platform 200 to couple the first platform 100 with the second platform 200, and may tri-dimensionally adjust the position of the second platform.

That is, the displacement module 600 displaces the second platform 200 to the central coordinate position of the motion that is to be simulated by the simulation device having the replaceable sensory module according to the present invention, and the riding-type sensory module 320 is coupled to the second platform 200, thus achieving more realistic simulation.

While the present invention has been described with respect to the specific embodiments, it will be apparent to those skilled in the art that various changes and modifications may be made without departing from the spirit and scope of the invention as defined in the following claims.

The invention claimed is:

1. A simulation device having a replaceable sensory module, comprising:
    a first platform performing a translational motion with reference to a first three-dimensional coordinate axis;
    a second platform coupled to the first platform and performing a rotational motion with reference to at least one axis among second three-dimensional coordinate axes; and
    a sensory module coupled to the second platform and supporting a user to enable the user to sense a motion provided by the first and second platforms,
    wherein the second platform is coupled to the first platform such that a vertical axis of the second coordinate axes and a vertical axis of the first coordinate axis are provided on a vertically extrapolated line.

2. The simulation device of claim 1, wherein the second platform performs a rotational motion with reference to two axes that are on a plane of the second coordinate axes, and the first platform performs a translational motion with reference to the first coordinate axis while simultaneously performs a rotational motion with reference to the first coordinate axis and the vertical axis of the second coordinate axes.

3. A simulation device having a replaceable sensory module, comprising:
    a first platform performing a translational motion with reference to a first three-dimensional coordinate axis;
    a second platform coupled to the first platform and performing a rotational motion with reference to at least one axis among second three-dimensional coordinate axes; and
    a sensory module coupled to the second platform and supporting a user to enable the user to sense a motion provided by the first and second platforms,
    wherein the first coordinate axis of the first platform and the second coordinate axis of the second platform are different in coordinate central point from each other,
    wherein the second platform is provided on a position of a coordinate axis of a motion simulated by the sensory module, and is coupled to the sensory module.

4. A simulation device having a replaceable sensory module, comprising:
- a first platform performing a translational motion with reference to a first three-dimensional coordinate axis;
- a second platform coupled to the first platform and performing a rotational motion with reference to at least one axis among second three-dimensional coordinate axes;
- a sensory module coupled to the second platform and supporting a user to enable the user to sense a motion provided by the first and second platforms; and
- a displacement module provided between the first platform and the second platform to couple the first platform with the second platform, and tri-dimensionally adjusting a position of the second platform.

5. The simulation device of claim 4, wherein the sensory module is selectively separated from the second platform.

6. A simulation device having a replaceable sensory module, comprising:
- a first platform performing a translational motion with reference to a first three-dimensional coordinate axis;
- a second platform coupled to the first platform and performing a rotational motion with reference to at least one axis among second three-dimensional coordinate axes; and
- a sensory module coupled to the second platform and supporting a user to enable the user to sense a motion provided by the first and second platforms,
- wherein the sensory module comprises the second platform on a motion coordinate axis of a motion that is to be simulated, and the second platform is selectively separated from the first platform.

* * * * *